US010952438B2

United States Patent
Takeda et al.

(10) Patent No.: US 10,952,438 B2
(45) Date of Patent: Mar. 23, 2021

(54) PESTICIDAL COMPOSITION AND METHOD FOR CONTROLLING PESTS

(71) Applicant: ISHIHARA SANGYO KAISHA, LTD., Osaka (JP)

(72) Inventors: Chiaki Takeda, Osaka (JP); Mitsugu Iwasa, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 0 days.

(21) Appl. No.: 16/768,389

(22) PCT Filed: Dec. 18, 2018

(86) PCT No.: PCT/JP2018/046517
§ 371 (c)(1),
(2) Date: May 29, 2020

(87) PCT Pub. No.: WO2019/124349
PCT Pub. Date: Jun. 27, 2019

(65) Prior Publication Data
US 2020/0329709 A1    Oct. 22, 2020

(30) Foreign Application Priority Data

Dec. 20, 2017  (JP) .............................. JP2017-244321

(51) Int. Cl.
*A01N 47/40*  (2006.01)
*A01N 27/00*  (2006.01)

(52) U.S. Cl.
CPC ............. *A01N 47/40* (2013.01); *A01N 27/00* (2013.01)

(58) Field of Classification Search
None
See application file for complete search history.

(56) References Cited

U.S. PATENT DOCUMENTS

| 8,361,515 | B2 | 1/2013 | Wei et al. |
| 8,586,108 | B2 | 11/2013 | Ye et al. |
| 2009/0130203 | A1 | 5/2009 | Wei et al. |
| 2010/0316738 | A1 | 12/2010 | Jimenez et al. |
| 2013/0178516 | A1 | 7/2013 | Wei et al. |
| 2013/0331462 | A1 | 12/2013 | Jimenez et al. |
| 2015/0216163 | A1* | 8/2015 | Hellwege ............... A01N 27/00 504/100 |
| 2015/0296773 | A1* | 10/2015 | Hellwege ............... A01N 41/10 514/28 |
| 2016/0165882 | A1 | 6/2016 | Jimenez et al. |

FOREIGN PATENT DOCUMENTS

| EP | 0 580 374 | 1/1996 |
| JP | 2009-522208 | 6/2009 |
| WO | 98/48625 | 11/1998 |
| WO | 02/34050 | 5/2002 |
| WO | 2010/144919 | 12/2010 |
| WO | 2014/019983 | 2/2014 |
| WO | 2014/029747 | 2/2014 |

OTHER PUBLICATIONS

"Material Safety Data Sheet Beleaf 50 SG Insecticide, FMC Corporation", Physical and chemical properties, Sep. 19, 2005, pp. 4.
R.G, Hollingsworth, "Limonene, a Citrus Extract, for Control of Mealybugs and Scale Insects", J. Econ. Entomol, 2005, pp. 772-779, vol. 98, No. 3.
International Search Report issued in International Patent Application No. PCT/JP2018/046517, dated Mar. 12, 2019 with English translation.
International Preliminary Report on Patentability issued in International Patent Application No. PCT/JP2018/046517, dated Jun. 23, 2020 with English translation.

\* cited by examiner

*Primary Examiner* — Alton N Pryor
(74) *Attorney, Agent, or Firm* — Greenblum & Bernstein, P.L.C.

(57) ABSTRACT

At present, many pesticidal compositions have been developed and used practically, however, they are not necessarily sufficient for controlling pests, and highly active pesticidal compositions have been desired.
To provide a pesticidal composition comprising flonicamid and D-limonene as active ingredients, in a mixing weight ratio of flonicamid to D-limonene of from 1:150 to 1:1, and a method for controlling pests by applying an effective amount of the composition.

7 Claims, 1 Drawing Sheet

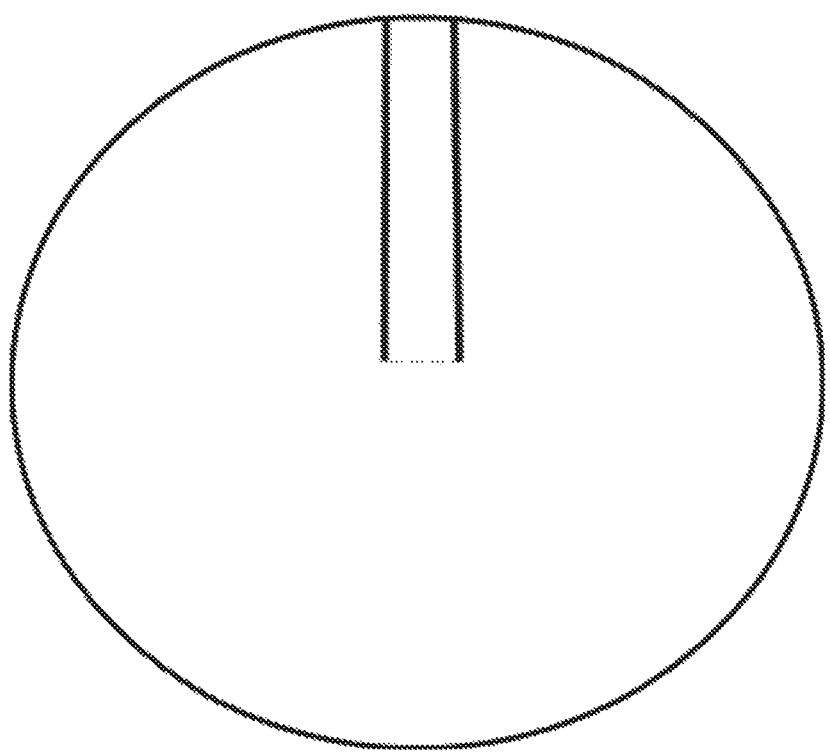

PESTICIDAL COMPOSITION AND METHOD FOR CONTROLLING PESTS

TECHNICAL FIELD

The present invention relates to a pesticidal composition having remarkably improved pesticidal effects, particularly insecticidal/miticidal effects, and a method for controlling pests using the composition.

BACKGROUND ART

Flonicamid is a common name and its chemical name is N-cyanomethyl-4-trifluoromethyl-3-pyridinecarboxamide. The compound is useful as an insecticide and is disclosed as compound No. 1 in Patent Document 1. Further, Patent Document 2 discloses that high pesticidal effects are obtained by using flonicamid and other pesticidal component such as chlorfluazuron in combination.

D-Limonene is a natural compound obtained from the skin of citrus fruits and its chemical name is (4R)-p-menth-1,8-diene. Patent Document 3 makes mention of an insecticidal composition containing D-limonene, however, it failed to specifically disclose specific insecticidal effects and contains no mention of combination with other insecticides. Patent Document 4 discloses a composition containing synergistically effective amounts of a terpene mixture containing limonene and an insecticide such as flonicamid. Patent Document 5 discloses a composition containing a terpene mixture containing limonene and a biological control agent in synergistically effective amounts, and discloses that the composition may further contain an insecticide such as flonicamid. However, a pesticidal composition comprising flonicamid in combination with D-limonene alone has not been known.

PRIOR ART DOCUMENTS

Patent Documents

Patent Document 1: EP 0580374 B1
Patent Document 2: WO02/34050
Patent Document 3: WO98/48625
Patent Document 4: WO2014/019983
Patent Document 5: WO2014/029747

DISCLOSURE OF INVENTION

Technical Problem

Conventional pesticidal compositions respectively have characteristics in spectra and effects, however, their effects may be insufficient against specific pest, their residual activity will last only for a short period of time and effects for a certain period of time cannot be expected, and they sometimes have practically no sufficient controlling effects. Also, even if there are some pesticidal compositions excellent in their pesticidal effects, they may be required to be improved in respect of safety to fishes, Crustacea and domestic animals and may also be required to achieve high pesticidal effects at a small dosage. Accordingly, at present, many pesticidal compositions have been developed and used practically, however, they are not necessarily sufficient for controlling pests, and more improved pesticidal compositions have been desired.

Solution to Problem

The present inventors have conducted extensive studies to achieve the above object and as a result, found that by using flonicamid and D-limonene in combination in a specific mixing ratio, effects which are more than expected can be obtained such that the dosage can be reduced as compared with a case where the respective active ingredient compounds are used individually, or certain specific pests can be controlled all at once, and accomplished the present invention.

That is, the present invention relates to a pesticidal composition comprising flonicamid and D-limonene as active ingredients, in a mixing weight ratio of flonicamid to D-limonene of from 1:150 to 1:1 (hereinafter sometimes referred to as the composition of the present invention). Further, the present invention relates to a method for controlling pests, which comprises applying an effective amount of the composition of the present invention.

Advantageous Effects of Invention

The composition of the present invention has stably high pesticidal effects against pests, particularly insects, especially scale insects, and by using the composition, pests can be controlled.

BRIEF DESCRIPTION OF DRAWINGS

FIG. 1 is a view as observed from above illustrating an absorbent cotton sheet used in Test Examples 1 to 3 of the present invention. A cut is put in a continuous line portion, and the cut portion is bent down at a broken line portion and put through a hole at a center portion of a plastic cup so as to be dipped in tap water in the plastic cup.

DESCRIPTION OF EMBODIMENTS

Preferred embodiments of the composition of the present invention are described below. The composition of the present invention is particularly useful, for example, as agents for controlling various pests which become problematic in the agricultural and horticultural fields, i.e. agricultural and horticultural pesticides, agents for controlling sanitary insect pests which are sanitarily harmful to the human, i.e. control agents against sanitary insect pests, agents for controlling pests harmful to trees and turf, i.e. control agents against pests on trees and turf, and agents for controlling pests harmful to clothes and household goods, i.e. control agents against clothes and household goods insect pests.

The agricultural and horticultural pesticides are useful as an insecticide, a miticide, a nematicide and a soil pesticide, and they are effective for controlling plant parasitic mites such as two-spotted spider mite (*Tetranychus urticae*), carmine spider mite (*Tetranychus cinnabarinus*), kanzawa spider mite (*Tetranychus kanzawai*), citrus red mite (*Panonychus citri*), European red mite (*Panonychus ulmi*), broad mite (*Polyphagotarsonemus latus*), pink citrus rust mite (*Aculops pelekassi*) and bulb mite (*Rhizoglyphus echinopus*); agricultural insect pests such as diamondback moth (*Plutella xylostella*), cabbage armyworm (*Mamestra brassicae*), common cutworm (*Spodoptera litura*), codling moth (*Laspeyresia pomonella*), bollworm (*Heliothis zea*), tobacco budworm (*Heliothis virescens*), gypsy moth (*Lymantria dispar*), rice leafroller (*Cnaphalocrocis medinalis*), smaller tea tortrix (*Adoxophyes* sp.), summer fruit tortrix (*Adoxophyes orana fasciata*), peach fruit moth (*Carposina niponensis*), oriental fruit moth (*Grapholita molesta*), black cutworm (*Agrotis ipsilon*), cutworm (*Agrotis segetum*), colorado potato beetle (*Leptinotarsa decemlineata*), cucurbit leaf beetle (*Aulacophora femoralis*), boll weevil (*Anthonomus grandis*), aphids, planthoppers, leafhoppers, scales, bugs, whiteflies, thrips, grasshoppers, anthomyiid flies, scarabs, ants, leafminer flies; plant parasitic nematodes such as root-knot nematodes, cyst nematodes, root-lesion nematodes, rice white-tip nematode (*Aphelenchoides besseyi*), strawberry bud nematode (*Nothotylenchus acris*), pine wood nematode (*Bursaphelenchus xylophilus*); gastropods such as slugs (*Incilaria bilineata*) and snails (*Euhadra*); soil pests such as isopods such as pillbugs (*Armadilidium vulgare*) and pillbugs (*Porcellio scaber*); stored grain insect pests such as angoumois grai moth (*Sitotroga cerealella*), adzuki bean weevil (*Callosobruchus chinensis*), red flour beetle (*Tribolium castaneum*) and mealworms (*Neatus picipes*). Further, as the fungicides, they are effective for controlling diseases such as blast (*Pyricularia oyzae*), brown spot (*Cochliobolus miyabeanus*) or sheath blight (*Rizoctinia sorani*) of rice; powdery mildew (*Blumeria graminis*), scab (*Gibberella zeae*), leaf rust (*Puccinia graminis*), snow mold (*Monographella nivalis*), loose smut (*Ustilago nuda*), eye spot (*Pseudocercosporella herpotrichoides*), speckled leaf blotch (*Septoria tritici*) or glume blotch (*Phaeosphaeria nodorum*) of cereals: melanoses (*Diaporthe citri*) or scab (*Elsinoë fawcettii*) of citrus; blossom blight (*Monilinia mali*), powdery mildew (*Podosphaera leucotricha*), *Altemaria* leaf spot (*Altemaria mali*) or scab (*Venturia inaequalis*) of apple; scab (*Venturia nashicola*) or black spot (*Altemaria kikuchiana*) of pear brown rot (*Monilinia fructicola*), scab (*Cladosporium carpophilum*) or *Phomopsis* rot (*Phomopsis* sp.) of peach; anthracnose (*Elsinoë ampelina*), ripe rot (*Colletotrichum acutatum*), powdery mildew (*Erysiphe necator*) or downy mildew (*Plasmopara viticola*) of grape; anthracnose (*Glomerella cingulate*) or leaf spot (*Mycosphaerella nawae*) of Japanese persimmon: anthracnose (*Colletotrichum orbiculare*), powdery mildew (*Erysiphe polygoni*), gummy stem blight (*Didymella bryoniae*) or downy mildew (*Pseudoperonospora cubensis*) of cucurbit); early blight (*Altemaria solani*), leaf mold (*Passalora fulva*) or late blight (*Phytophthora infestans*) of tomato; various *Altemaria* leaf spot (*Altemaria brassicae*) of cruciferous vegetables; late blight (*Phytophthora infestans*) or early blight (*Altemaria solani*) of potato; powdery mildew (*Sphaerotheca aphanis*) of strawberry; and gray mold or disease caused by Sclerotinia of various crops; and controlling soil diseases caused by plant pathogens such as Fusarium, Pythium, Rhizoctonia, Verticillium and Plasmodiophora. As the controlling agents against sanitary insect pests, they are effective for controlling insects which carry pathogen to infect human with diseases, such as *Culex* tritaenitorhynchus, yellow fever mosquito (*Aedes aegypti*), *Anopheles*, Asian tiger mosquito (*Aedes albopictus*), Chinese *Anopheles* (*Anopheles sinensis*), *Aedes togoi*, *Mansonia*, *Aedes*, sand fly (*Phlebotominae*), Assassin bug (*Reduviidae*), tsetse fly (*Glossina*), house mosquito (*Culex pipiens*), tropical rat mite (*Ornithonyssus bacoti*), housefly (*Musca domestica*), cockroaches, black flies, horse flies, fleas, mites and ticks, Trombiculid mites and sucking-lice, insects which directly harm human by blood sucking, biting or the like, such as vespids, paper wasps and tussok moths; nuisances such as ant (*Formicidae*), sow bug (*Porcellio scaber*), spider (*Araneae*), pill bugs (*Armadilidium vulgare*), centipede (*Chilopoda*), millipede (*Diplopoda*) and house centipede (*Thereuonema tuberculata*); and domestic mites which causes allergic diseases, such as Tyrophagus putrescentiae, Dormatophagoides farinae and Chelacaropsis moorei. As the control agents against pests on trees and turf, they are effective for controlling trees pests such as pine wood nematode (*Bursaphelenchus xylophilus*), pine sawyer (*Monochamus altematus*), gypsy moth (*Lymantria dispar*), oriental moth (*Monema flavescens*), fall webworm (*Hyphantria cunea*), bagworm moth (*Psychidae*), wax scale (*Ceroplastes*), scale insects (*Coccoidea*), Stephanitis pyrioides and *Dendrolimus spectabilis*; and pests against turf such as scarabs (*Scarabaeidae*), lawn grass cutworm (*Spodoptera depravata*), bluegrass webworm (*Parapediasia teterrella*), hunting billbug (*Sphenophorus venatus*) and mole cricket (*Gryllotalpidae*). Further, as the control agents against clothes and household goods insect pests, they are effective for controlling case-making clothes moth (*Tinea pellionella*), black carpet beetle (*Anthrenus scrophularidae*) and termites (*Termitidae*). Among them, the agricultural and horticultural pesticides are particularly effective for controlling plant parasitic mites, agricultural insect pests, plant parasitic nematodes, various diseases or the like, and have excellent effects particularly for controlling scales, aphids, planthoppers, leafhoppers, whiteflies, thrips and bugs. Further, they are effective against insect pests having acquired resistance to organophosphorus, carbamate and/or synthetic pyrethroid insecticides. Moreover, the composition of the present invention has excellent systemic properties, and by the application of the agricultural and horticultural pesticide to soil, not only noxious insects, noxious mites, noxious nematodes, noxious gastropods and noxious isopods in soil but also foliage pests can be controlled.

In the present invention, the mixing weight ratio of flonicamid to D-limonene is from 1:150 to 1:1, preferably from 1:20 to 1:1. The composition of the present invention is, in the same manner as conventional agricultural chemicals, formulated together with an agricultural adjuvant into an emulsifiable concentrate, a dust, granules, a wettable powder, water-dispersible granules, a suspension concentrate, a soluble concentrate, an aerosol, a paste, etc. That is, the composition of the present invention may be formulated by mixing the respective active ingredients, or by mixing formulations of the respective active ingredients. The ratio of the agricultural adjuvant is usually from 1 to 99.999 parts by weight based on from 0.001 to 99 parts by weight of the active ingredients, preferably from 5 to 99.99 parts by weight based on from 0.01 to 95 parts by weight of the active ingredients, more preferably from 20 to 99.99 parts by weight based on from 0.01 to 80 parts by weight of the active ingredients. In the actual application of such a formulation, it may be used as it is, or may be diluted to a predetermined concentration with a diluent such as water.

As the agricultural adjuvant, there may be mentioned carriers, emulsifiers, suspending agents, dispersants, extenders, penetrating agents, wetting agents, thickeners, defoaming agents, stabilizers or antifreezing agents. They may be added as the case requires. The carriers may be classified into solid carriers and liquid carriers. As the solid carriers, there may be mentioned powders of animal and plant origin, such as starch, activated carbon, soybean flour, wheat flour, wood powder, fish powder or powdered milk; or mineral powders such as talc, kaolin, bentonite, calcium carbonate, zeolite, diatomaceous earth, white carbon, clay or alumina; sulfur powder; anhydrous sodium sulfate; and the like. As the liquid carriers, there may be mentioned water; alcohols such as methyl alcohol or ethylene glycol; ketones such as acetone, methyl ethyl ketone or N-methyl-2-pyrrolidone; ethers such as dioxane or tetrahydrofuran; aliphatic hydrocarbons such as kerosene, kerosine or the like; aromatic hydrocarbons such as xylene, trimethylbenzene, tetramethylbenzene, cyclohexane or solvent naphtha; halogenated hydrocarbons such as chloroform or chlorobenzene; acid amides such as dimethylformamide; esters such as ethyl acetate or glycerine ester of a fatty acid; nitriles such as acetonitrile; sulfur-containing compounds such as dimethyl sulfoxide; vegetable oils such as soybean oil or corn oil; and the like.

The composition of the present invention is applied in an active ingredient concentration of flonicamid of usually from 0.01 to 1,000 ppm, preferably from 0.1 to 1,000 ppm, more preferably from 10 to 160 ppm and in an active ingredient concentration of D-limonene of usually from 0.1 to 50,000 ppm, preferably from 1 to 20,000 ppm, more preferably from 180 to 1,440 ppm. Further, in a case where flonicamid and D-limonene are applied as diluted with water, the amount of water used for dilution is from 10 to 50,000 L, preferably from 25 to 10,000 L, per hectare. The active ingredient concentrations may optionally be changed depending upon the formulation, the manner, purpose, timing or place of the application and the condition of the insect pests. For example, aquatic noxious insects can be controlled by applying a formulation having the above-mentioned concentration to the site of the outbreak, and thus, the concentrations of the active ingredients in water are less than the above-mentioned range. As the amounts of the application of the active ingredients per unit surface area, the active ingredient concentration of flonicamid is from 0.0001 to 50,000 g, preferably from 0.0025 to 10,000 g, more preferably from 10 to 160 g per hectare, and the active ingredient concentration of D-limonene is from 0.001 to 50,000 g, preferably from 0.005 to 10,000 g, more preferably from 180 to 1,440 g per hectare. However, in a certain special case, the amounts of the application may be outside the above range. The compound of the present invention may be applied by conventional methods for application which are commonly employed, such as spraying (e.g. spraying, jetting, misting, atomizing, powder or grain scattering or dispersing in water), soil application (e.g. mixing or drenching), surface application (e.g. coating, powdering or covering) or impregnation to obtain poisonous feed. Further, it is possible to feed domestic animals with a food containing the above active ingredients and to control the outbreak or growth of pests, particularly insects pests, with their excrements. Furthermore, the active ingredients may also be applied by a so-called ultra low-volume application method. In this method, the composition may be composed of 100% of the active ingredients.

Further, the composition of the present invention may be mixed with or may be used in combination with other agricultural chemicals, fertilizers or phytotoxicity-reducing agents, whereby more excellent effects or activities may sometimes be obtained. Such other agricultural chemicals include, for example, an insecticide, a miticide, a nematicides, a soil pesticide, a fungicide, a herbicide, an antivirus agent, an attractant, a plant hormone and a plant growth regulating agent. Especially, with a pesticidal composition having the composition of the present invention mixed with or used in combination with one or more active ingredients of other agricultural chemicals, the application range, the application time, the pesticidal activities, etc. may be improved to preferred directions. The respective active ingredient compounds may separately be formulated so that they may be mixed for use at the time of application, or they may be formulated together. The present invention includes such a pesticidal composition.

The active ingredient compounds of insecticides, miticides, nematicides or soil pesticides in the above-mentioned other agricultural chemicals, include, for example, (by common names, some of them are still in an application stage, or test codes of Japan Plant Protection Association) organic phosphate compounds such as profenofos, dichlorvos, fenamiphos, fenitrothion, EPN, diazinon, chlorpyrifos, chlorpyrifos-methyl, acephate, prothiofos, fosthiazate, cadusafos, dislufoton, isoxathion, isofenphos, ethion, etrimfos, quinalphos, dimethylvinphos, dimethoate, sulprofos, thiometon, vamidothion, pyraclofos, pyridaphenthion, pirimiphos-methyl, propaphos, phosalone, formothion, malathion, tetrachlovinphos, chlorfenvinphos, cyanophos, trichlorfon, methidathion, phenthoate, ESP, azinphos-methyl, fenthion, heptenophos, methoxychlor, parathion, phosphocarb, demeton-S-methyl, monocrotophos, methamidophos, imicyafos, parathion-methyl, terbufos, phosphamidon, phosmet, phorate, phoxim and triazophos; carbamate compounds such as carbaryl, propoxur, aldicarb, carbofuran, thiodicarb, methomyl, oxamyl, ethiofencarb, pirimicarb, fenobucarb, carbosulfan, benfuracarb, bendiocarb, furathiocarb, isoprocarb, metolcarb, xylylcarb, XMC and fenothiocarb; nereistoxin derivatives such as cartap, thiocyclam, bensultap, thiosultap-sodium, thiosultap-disodium, monosultap, biultap and thiocyclam hydrogen oxalate; organic chlorine compounds such as dicofol, tetradifon, endosulufan, dienochlor and dieldrin; organic metal compounds such as fenbutatin Oxide and cyhexatin, pyrethroid compounds such as fenvalerate, permethrin, cypermethrin, deltamethrin, cyhalothrin, tefluthrin, ethofenprox, flufenprox, cyfluthrin, fenpropathrin, flucythrinate, fluvalinate, cycloprothrin, lambda-cyhalothrin, pyrethrins, esfenvalerate, tetramethrin, resmethrin, protrifenbute, bifenthrin, zeta-cypermethrin, acrinathrin, alpha-cypermethrin, allethrin, gamma-cyhalothrin, theta-cypermethrin, tau-fluvalinate, tralomethrin, profluthrin, beta-cypermethrin, beta-cyfluthrin, metofluthrin, phenothrin, flumethrin and decamethrin; benzoylurea compounds such as diflubenzuron, chlorfluazuron, teflubenzuron, flufenoxuron, triflumuron, hexaflumuron, lufenuron, novaluron, noviflumuron, bistrifluron and fluazuron; juvenile hormone-like compounds such as methoprene, pyriproxyfen, fenoxycarb and diofenolan; pyridazinone compounds such as pridaben; pyrazole compounds such as fenpyroximate, fipronil, tebufenpyrad, ethiprole, tolfenpyrad, acetoprole, pyrafluprole and pyriprole; neonicotinoid compounds such as imidacloprid, nitenpyram, acetamiprid, thiacloprid, thiamethoxam, clothianidin, nidinotefuran, dinotefuran and nithiazine; hydrazine compounds such as tebufenozide, methoxyfenozide, chromafenozide and halofenozide; pyridine compounds such as pyridaryl and flonicamid; cyclic ketoenol compounds such as spirodiclofen, spiromesifen and spirotetramat; strobilurin compounds such as fluacrypyrim; pyridinamine compounds such as flufenerim; dinitro compounds; organic sulfur compounds; urea compounds; triazine compounds; hydrazone compounds; and other compounds such as flometoquin, buprofezin, hexythiazox, amitraz, chlordimeform, silafluofen, triazamate, pymetrozine, pyrimidifen, chlorfenapyr, indoxacarb, acequinocyl, etoxazole, cyromazine, 1,3-dichloropropene, diafenthiuron, benclothiaz, bifenazate, propargite, clofentezine, metaflumizone, flubendiamide, cyflumetofen, chlorantraniliprole, cyantraniliprole, cyclaniliprolem, cyenopyrafen, pyrifluquinazon, fenazaquin, amidoflumet, sulfluramid, hydramethylnon, metaldehyde, ryanodine, verbutin, chlorobenzoate, thiazolylcinnanonitrle, sulfoxaflor, fluensulfone, triflumezopyrim, afidopyropen, flupyradifuron, fluxametamide, tetraniliprole, fluralaner, broflanilide, pyflubumide, dicloromezotiaz, fluhexafon, tioxazafen, fluazaindolizine, NA-89, NNI-1501, S-1587, and the like. Further, microbial agricultural chemicals such as insecticidal crystal protein produced by *Bacillus*

*thuringienses* such as *Bacillus thuringienses aizawai, Bacillus thuringienses kurstaki, Bacillus thuringienses israelensis, Bacillus thuringienses japonensis* or *Bacillus thuringienses tenebrionis*, insect viruses, etomopathogenic fungi, and nematophagous fungi; antibiotics or semisynthetic antibiotics such as avermectin, emamectin-benzoate, milbemectin, milbemycin, spinosad, ivermectin, lepimectin, DE-175, abamectin and emamectin and spinetoram; natural products such as azadirachtin and rotenone; and repellents such as deet may, for example, be mentioned.

The active ingredient compounds of fungicides in the above-mentioned other agricultural chemicals include, for example, (by common names, some of them are still in an application stage, or test codes of Japan Plant Protection Association) anilinopyrimidine compounds such as mepanipyrim, pyrimethanil, cyprodinil and ferimzone; triazolopyrimidine compounds such as 5-chloro-7-(4-methylpiperdin-1-yl)-6-(2,4,6-trifluorophenyl)-[1,2,4]triazolo[1,5-a]pyrimidine; pyridinamine compounds such as fluazinam; azole compounds such as triadimefon, bitertanol, triflumizole, etaconazole, propiconazole, penconazole, flusilazole, myclobutanil, cyproconazole, tebuconazole, hexaconazole, furconazole-cis, prochloraz, metconazole, epoxiconazole, tetraconazole, oxpoconazole fumarate, sipconazole, prothioconazole, triadimenol, flutriafol, difenoconazole, fluquinconazole, fenbuconazole, bromuconazole, diniconazole, tricyclazole, probenazole, simeconazole, pefurazoate, ipconazole and imibenconazole; quinoxaline compounds such as quinomethionate; dithiocarbamate compounds such as maneb, zineb, mancozeb, polycarbamate, metiram, propineb and thiram; organic chlorine compounds such as fthalide, chlorothalonil and quintozene, imidazole compounds such as benomyl, cyazofamid, thiophanate-methyl, carbendazim, thiabendazole and fuberiazole; cyanoacetamide compounds such as cymoxanil; anilide compounds such as metalaxyl, metalaxyl-M, mefenoxam, oxadixyl, ofurace, benalaxyl, benalaxyl-M (another name: kiralaxyl, chiralaxyl), furalaxyl, cyprofuram, carboxin, oxycarboxin, thifluzamide, boscalid, bixafen, isothianil, tiadinil and sedaxane; sulfamide acid compounds such as dichlofluanid; copper compounds such as cupric hydroxide and oxine copper; isoxazole compounds such as hymexazol; organophosphorus compounds such as fosetyl-Al, tolclofos-methyl, S-benzyl O,O-diisopropylphosphorothioate, O-ethyl S,S-diphenylphosphorodithioate, aluminum ethyl-hydrogen phosphonate, edifenphos and iprobenfos; phthalimide compounds such as captan, captafol and folpet; dicarboximide compounds such as procymidone, iprodione and vinclozolin; benzanilide compounds such as flutolanil and mepronil; amide compounds such as penthiopyrad, mixture of 3-(difluoromethyl)-1-methyl-N[(1RS,4SR,9SR)-1,2,3,4-tetrahydro-9-isopropyl-1,4-methanonaphthalen-5-yl]pyrazole-4-carboxamide and 3-(difluoromethyl)-1-methyl-N-[(1RS,4SR,9SR)-1,2,3,4-tetrahydro-9-isopropyl-1,4-methanonaphthalen-5-yl]pyrazole-4-carboxamide (isopyrazam), silthiopham, fenoxanil and furametpyr benzamide compounds such as fluopyram and zoxamide; piperazine compounds such as triforine; pyridine compounds such as pyrifenox; carbinol compounds such as fenarimol; piperidine compounds such as fenpropidine, morpholine compounds such as fenpropimorph and tridemorph; organotin compounds such as fentin hydroxide and fentin acetate; urea compounds such as pencycuron; cinnamic acid compounds such as dimethomorph and flumorph; phenylcarbamate compounds such as diethofencarb, cyanopyrrole compounds such as fludioxonil and fenpiconil; strobilurin compounds such as azoxystrobin, kresoxim-methyl, metominostrobin, trifloxystrobin, picoxystrobin, oryzastrobin, dimoxystrobin, pyracostrobin and fluoxastrobin; oxazolidinone compounds such as famoxadone, thiazolecarboxamide compounds such as ethaboxam; valinamide compounds such as iprovalicarb and benthiavalicarb-isopropyl; amino acid compounds such as methyl N-(isopropoxycarbonyl)-L-valyl-(3RS)-3-(4-chlorophenyl)-β-alaninate (valifenalate), imidazolidinone compounds such as fenamidone; hydroxanilide compounds such as fenhexamid; benzenesulfonamide compounds such as flusulfamide; oxime ether compounds such as cyflufenamid; anthraquinone compounds; crotonic acid compounds; antibiotics such as validamycin, kasugamycin and polyoxins; guanidine compounds such as iminoctadine and dodine; quinoline compounds such as tebufloquin; thiazolidine compounds such as flutianil; and other compounds such as pyrbencarb, isoprothiolane, Pyroquilon, diclomezine, quinoxyfen, propamocarb hydrochloride, chloropicrin, dazomet, metam-sodium, nicobifen, metrafenone, UBF-307, diclocymet, proquinazid, amisulbrom (another name: amibromdole), pyrofenone, isofetamid, mandipropamid, fluopicolide, carpropamid, meptyldinocap, spiroxamine, fenpyrazamine, mandestrobin, ZF-9646, BCF-051, BCM-061 and BCM-062.

In addition, the agricultural chemicals which may be mixed with or may be used in combination with the composition of the present invention may, for example, be active ingredient compounds of herbicides as disclosed in The Pesticide Manual (15th edition), particularly soil application type.

Now, preferred embodiments of the present invention will be described, however, it should be understood that the present invention is by no means restricted thereto.

(1) A pesticidal composition comprising flonicamid and D-limonene as active ingredients, in a mixing weight ratio of flonicamid to D-limonene of from 1:150 to 1:1.

(2) The composition according to (1), wherein the mixing weight ratio of flonicamid to D-limonene is from 1:20 to 1:1.

(3) The composition according to (1), wherein the mixing weight ratio of flonicamid to D-limonene is as defined in (1), which has a synergistic controlling effect.

(4) The composition according to (2), wherein the mixing weight ratio of flonicamid to D-limonene is as defined in (2), which has a synergistic controlling effect.

(5) The composition according to any one of (1) to (4), which contains only flonicamid and D-limonene as pesticidally active ingredients.

(6) The composition according to any one of (1) to (5), which consists solely of an insecticidally effective amount of flonicamid, an insecticidally effective amount of D-limonene and an agricultural adjuvant.

(7) The composition according to (6), wherein the ratio of the agricultural adjuvant is from 1 to 99.999 parts by weight based on from 0.001 to 99 parts by weight of the active ingredients flonicamid and D-limonene.

(8) The composition according to any one of (1) to (7), which is an insecticide, a miticide, a nematicide or a soil pesticide.

(9) The composition according to any one of (1) to (8), which is an insecticide.

(10) A method for controlling pests, which comprises applying an effective amount of a pesticidal composition comprising flonicamid and D-limonene as active ingredients in a mixing weight ratio of flonicamid to D-limonene of from 1:150 to 1:1.

(11) The method according to (10), wherein the mixing weight ratio of flonicamid to D-limonene is from 1:20 to 1:1.

(12) The method according to (10), which comprises applying a synergistically effective amount of the pesticidal composition comprising flonicamid and D-limonene as active ingredients in a mixing weight ratio of flonicamid to D-limonene of from 1:150 to 1:1.

(13) The method according to (11), which comprises applying a synergistically effective amount of the pesticidal composition with a mixing weight ratio of flonicamid to D-limonene of from 1:20 to 1:1.

(14) The method according to any one of (10) to (13), wherein effective amounts of flonicamid and D-limonene alone are applied as pesticidally active ingredients.

(15) The method according to any one of (10) to (14), wherein the amount of application of flonicamid is from 0.0001 to 50,000 g/ha, and the amount of application of D-limonene is from 0.001 to 50,000 g/ha.

(16) The method according to any one of (10) to (15), which comprises applying a pesticidal composition consisting solely of a pesticidally effective amount of flonicamid and a pesticidally effective amount of D-limonene, and an agricultural adjuvant.

(17) The method according to (16), wherein the ratio of the agricultural adjuvant is from 1 to 99.999 parts by weight based on from 0.001 to 99 parts by weight of the active ingredients flonicamid and D-limonene.

(18) The method according to any one of (10) to (17), wherein the pests are insects, mites, nematodes or soil pests.

(19) The method according to any one of (10) to (18), wherein the pests are insects.

(20) The method according to any one of (10) to (19), wherein the pests are scale insects.

EXAMPLES

Now, the present invention will be described with reference to Examples of the present invention. However, it should be understood that the present invention is by no means restricted thereto.

Test Example 1 (Test on Effects Against Comstock Mealybug (*Pseudococcus comstocki*))

A plastic cup (diameter 9 cm, height: 4 cm) filled with tap water was covered with a plastic lid (diameter 9 cm, with a hole having a diameter of 0.5 cm at its center portion), and an absorbent cotton sheet (diameter 9 cm) as shown in FIG. 1 was placed thereon. The cut portion of the absorbent cotton sheet was put into the plastic cup through the hole at the center portion of the lid and dipped in the tap water. Filter paper (diameter 9 cm) was placed on the absorbent cotton sheet, and a kidney bean primary leaf was further placed thereon so that the abaxial side faced upward. The kidney bean primary leaf was covered with filter paper (diameter 9 cm, with a hole having a diameter of 3 cm at its center portion) to prepare a leaf disk.

Thirty first instar larvae of Comstock mealybug (*Pseudococcus comstocki*) were released on the hole at the center portion of the leaf disk, and the leaf disk was left at rest in a breeding room (25° C., humidity: 60%). Two days later, the number of surviving larvae in the leaf disk was examined, and then a chemical solution at predetermined concentrations of active ingredients was sprayed on the leaf disc by a rotary spraying apparatus (tower sprayers TS-301) in an application amount corresponding to 100 L/10 a, and the leaf disk was left at rest in the breeding room. Seven days after application, the number of surviving larvae was examined, and the difference with the number of surviving larvae before application was taken as the mortality. The same test was conducted using tap water as a negative control, the corrected mortality (%) was calculated in accordance with the formula 1, and the results are shown in Table 1. Further, in accordance with the Colby's formula, the theoretical value (%) was calculated based on the obtained corrected mortality and shown in brackets in Table 1. The composition of the present invention has a synergistic pesticidal effect when the corrected mortality is higher than the theoretical value by the Colby's formula. The test was conducted three times.

Corrected mortality (%)=100×((morality in treated area−mortality in control area)/(100−mortality in control area))      Formula 1

TABLE 1

| Flonicamid (ppm) | D-Limonene (ppm) | | |
|---|---|---|---|
| | 1440 | 720 | 0 |
| 20 | 66.2 (39.3) | 33.0 (22.6) | 16.1 |
| 10 | 41.3 (33.4) | 42.9 (15.0) | 7.9 |
| 0 | 27.7 | 7.7 | 0 |

Test Example 2

The same test as in Test Example 1 was conducted except that the concentration of flonicamid was different. The test was conducted three times, and the results are shown in Table 2.

TABLE 2

| Flonicamid (ppm) | D-Limonene (ppm) | | |
|---|---|---|---|
| | 1440 | 720 | 0 |
| 160 | 84.5 (75.4) | 87.2 (70.2) | 68.8 |
| 0 | 21.3 | 4.5 | 0 |

Test Example 3

The test was conducted in the same manner as in Test Example 1 except that the concentrations of flonicamid and D-limonene were different. The test was conducted three times, and the results are shown in Table 3.

TABLE 3

| Flonicamid (ppm) | D-Limonene (ppm) | | |
|---|---|---|---|
| | 360 | 180 | 0 |
| 160 | 81.0 (70.8) | 70.0 (55.0) | 55.0 |
| 80 | 74.8 (51.6) | 35.8 (25.5) | 25.5 |
| 0 | 35.1 | 0 | 0 |

The entire disclosure of Japanese Patent Application No. 2017-244321 filed on Dec. 20, 2017 including specification, claims, drawings and abstract is incorporated herein by reference in its entirety.

The invention claimed is:

1. A pesticidal composition comprising flonicamid and D-limonene as active ingredients, wherein D-limonene is the only terpene in the pesticidal composition, and wherein the flonicamid and D-limonene together exhibit synergy.

2. The pesticidal composition according to claim 1, which is an insecticide, a miticide, a nematicide or a soil pesticide.

3. The pesticidal composition according to claim 1, which is an insecticide.

4. A method for controlling pests, which comprises applying to at least one of soil, plants, or pests an effective amount of a pesticidal composition comprising flonicamid and D-limonene as active ingredients, wherein D-limonene is the only terpene in the pesticidal composition, and wherein the flonicamid and D-limonene together exhibit synergy.

5. The method according to claim 4, wherein the pests are insects, mites, nematodes or soil pests.

6. The method according to claim 4, wherein the pests are insects.

7. The method according to claim 4, wherein the pests are scale insects.

* * * * *